(12) United States Patent
Livingston et al.

(10) Patent No.: US 7,922,829 B2
(45) Date of Patent: Apr. 12, 2011

(54) CLEANING SYSTEM FOR FLAT-PLATE MEMBRANE CARTRIDGES

(75) Inventors: Dennis Livingston, Austin, TX (US); Mark Steelman Stone, Cedar Park, TX (US); Edward Alan David, Austin, TX (US); Steve Stach, Burnet, TX (US); Roland Schneider, Round Rock, TX (US)

(73) Assignee: GLV Finance Hungary KFT, Munsbach (LU)

( * ) Notice: Subject to any disclaimer, the term of this patent is extended or adjusted under 35 U.S.C. 154(b) by 183 days.

(21) Appl. No.: 12/156,671

(22) Filed: Jun. 2, 2008

(65) Prior Publication Data

US 2009/0293917 A1 Dec. 3, 2009

(51) Int. Cl.
*B08B 3/02* (2006.01)
*B08B 3/04* (2006.01)
*B01D 41/04* (2006.01)

(52) U.S. Cl. ............... 134/25.1; 134/22.18; 134/34

(58) Field of Classification Search ............ 134/22.18, 134/34, 24, 25.1, 25.5; 210/407, 791, 797
See application file for complete search history.

(56) References Cited

U.S. PATENT DOCUMENTS

| 3,650,281 A | | 3/1972 | Hurst | |
| 4,859,332 A | * | 8/1989 | Johnson | 210/332 |
| 4,882,049 A | * | 11/1989 | Davis | 210/225 |
| 5,545,338 A | * | 8/1996 | Ginn et al. | 210/791 |
| 5,759,397 A | * | 6/1998 | Larsson et al. | 210/331 |
| 5,846,415 A | * | 12/1998 | Tsuchida et al. | 210/225 |
| 5,964,959 A | | 10/1999 | Bleth | |
| 6,156,213 A | | 12/2000 | Dudley et al. | |
| 6,277,209 B1 | | 8/2001 | Yamada et al. | |
| 6,638,361 B2 | | 10/2003 | Hatanaka et al. | |
| 7,244,290 B2 | | 7/2007 | Vandenbelt et al. | |
| 2007/0251891 A1 | | 11/2007 | Lownertz et al. | |
| 2007/0267516 A1 | | 11/2007 | Feith et al. | |

* cited by examiner

*Primary Examiner* — Michael Kornakov
*Assistant Examiner* — Natasha Campbell
(74) *Attorney, Agent, or Firm* — Thomas M. Freiburger

(57) ABSTRACT

A cleaning system and method remove localized caked or dewatered solids from flat-plate membranes in a sewage treatment plant. The caked sludge on the membranes is removed by intense coherent water sprays directed into the spaces between cartridges of a cassette, without removing the cartridges from the cassette. The sprays can be delivered from the top and/or bottom of the cassette, or the side panels of a cassette can be removed for spraying from at least one side, preferably both sides, using a mechanical device with movable spray bars and motor-driven advancing of the spray bars. In one preferred form of the system the apparatus includes horizontal cutting jets followed by angled cutting jets that further break up and wash away the loosened sludge. Jet diameter, velocity and pressure are controlled so as not to damage the membranes or cartridges but to achieve efficient cleaning.

27 Claims, 8 Drawing Sheets

CLEANING SYSTEM FOR FLAT-PLATE MEMBRANE CARTRIDGES

BACKGROUND OF THE INVENTION

This invention concerns membrane filtration in sewage treatment facilities, particularly with flat-plate membranes, and is directed to removal of fouling in the form of caked, dewatered sludge from the surface of the membranes in an efficient manner.

Membrane equipment used in submerged membrane bioreactors (sMBRs) operates in what is called mixed liquor, a concentrated solution of active biosolids. In this environment membranes are subjected to several types of fouling, most of which occur at the microscopic level. However, a type of fouling called dewatering, caking or sludging can occur under various conditions at the macroscopic level and significantly decrease membrane performance. This invention is concerned with the latter type of fouling, which is on a macroscopic level, whereby solids accumulate at the membrane surface to form a dense and visible cake. This type of phenomenon generally occurs in pockets as a result of insufficient rise velocities in the presence of high solids and debris. In hollow-fiber systems that use potting to secure individual fibers, solids accumulation will often occur at the potted ends. For flat-plate systems, solids can accumulate between membrane plates or cartridges supported by frames called cassettes.

Theoretically, the likelihood of dewatering is a function of flux and rise velocity, among other factors. This is one of the reasons some membrane suppliers have moved to reduce design fluxes. However, in practice, the root cause of dewatering is often related to system design and operational issues that are unrelated to membrane equipment. It is a fact for any sMBR system that an operator can accidentally (manually) turn off air during filtration or that plant hydraulics can starve specific membrane zones creating de facto thickeners. The problem that needs to be addressed is how to handle dewatering if and when it occurs.

Until recently there were no known methods for addressing dewatering without manual or physical cleaning (by hand) at the membrane module/element (cartridge or fiber bundle) level. Water jetting with fire hoses or garden hoses has been used unsuccessfully and is not recommended by most equipment manufacturers because it can damage membrane materials or joints (connection points). Also, water jetting has only been used at the cartridge level, cleaning one cartridge at a time, making costs and treatment time prohibitively high.

It is an object of this invention to efficiently clean caked sludge from flat-plate membrane cartridges using a liquid spray that does not damage the cartridges.

SUMMARY OF THE INVENTION

The method and system of the invention clean the membranes of an entire cassette together, rather than one membrane cartridge at a time, with a liquid spray that cuts through the caked and dewatered sludge of a series of cartridges simultaneously, without damaging the membranes or cartridges. This cutting spray preferably is followed by a second set of angled cutting nozzles that remove the loosened material from between the cartridges.

In the invention a jet of liquid, preferably water, of a prescribed diameter and velocity is directed between adjacent cartridges in a cassette. Although this can be done from the top of the cassette down through the spaces between the cartridges, it is preferably done from the side, after removing a side panel of the cassette. In one preferred procedure side panels are removed from the cassette at both opposite sides that expose the edges of the cartridges, and water jets are directed into both sides. This can be sequentially or simultaneously. Preferably spray bars are located on both sides of the cassette for simultaneous operation at both sides. The spray bars on opposed sides are offset from each other to improve cleaning efficiency.

In the most preferred form of the invention, a plurality of water jets are included in a spray apparatus positioned at the side of a cassette. Although fewer can be included, it is advantageous to include at least a water jet for each space between cartridges, in a linear array or in an upper and a lower linear array. Spacing could be the same as that between cartridges, but because this spacing is small the nozzles can be more widely spaced, and in two tiers or rows, with side-to-side travel of the nozzles as well as vertical travel. The array of jets can be staggered as to angle if desired, with alternate jets oriented at a downward angle. These water jets, which can be called cutting water jets, are high cohesive nozzles engineered to ensure good coverage and penetration of dewatered solids caked on the membranes, to break up and remove from membranes sludge material without damaging the membrane material or joints in the membrane cartridges. Immediately after the cutting jets clear this material, a further plurality of angled jets is preferably included to spray water in the same inter-cartridge spaces to further loosen and flush away the material loosened by the cutting jets.

This line of angled jets may be on a separate manifold bar or bars that feed pressurized liquid to the jets. The bars of nozzles are moved progressively along the inter-cartridge spaces by a motorized unit that advances the bars or jets up and down along the frame and also, in a preferred embodiment, about three inches side-to-side travel to achieve full coverage of the cassette. The horizontal side-to-side travel is simultaneous with the vertical travel. The movement can be by pneumatics, hydraulics or mechanical drive, such as a worm gear drive or chain drive. Side-to-side movement of the manifold or of the carriage can be by any suitable form of mechanism, such as a rotating cam. In the case of pneumatic or hydraulic drive, the pumps can be elsewhere, fed by flexible tubes, or they can be onboard the frame of the mechanism.

The cutting jet diameter and velocity of flow from the jet are important parameters, the velocity being a function of the jet diameter and the pressure behind the jet. Usually a cassette of membrane cartridges can be cleaned from only one side using jets within the parameter ranges of the invention, but, as stated earlier, it is preferable to clean from both sides.

It is therefore among the objects of the invention to efficiently clean flat-plate membrane cartridges contained within a cassette of cartridges, using a series of water jets directed between adjacent cartridges, efficiently removing dewatered sludge clinging to the membrane surfaces. This can be accomplished by using a machine which moves the series of jets along the spaces between the cartridges, preferably from both sides, but alternatively from top and bottom. These and other objects, advantages and features of the invention will be apparent from the following description of a preferred embodiment, considered along with the accompanying drawings.

DESCRIPTION OF PREFERRED EMBODIMENTS

Figure 1:
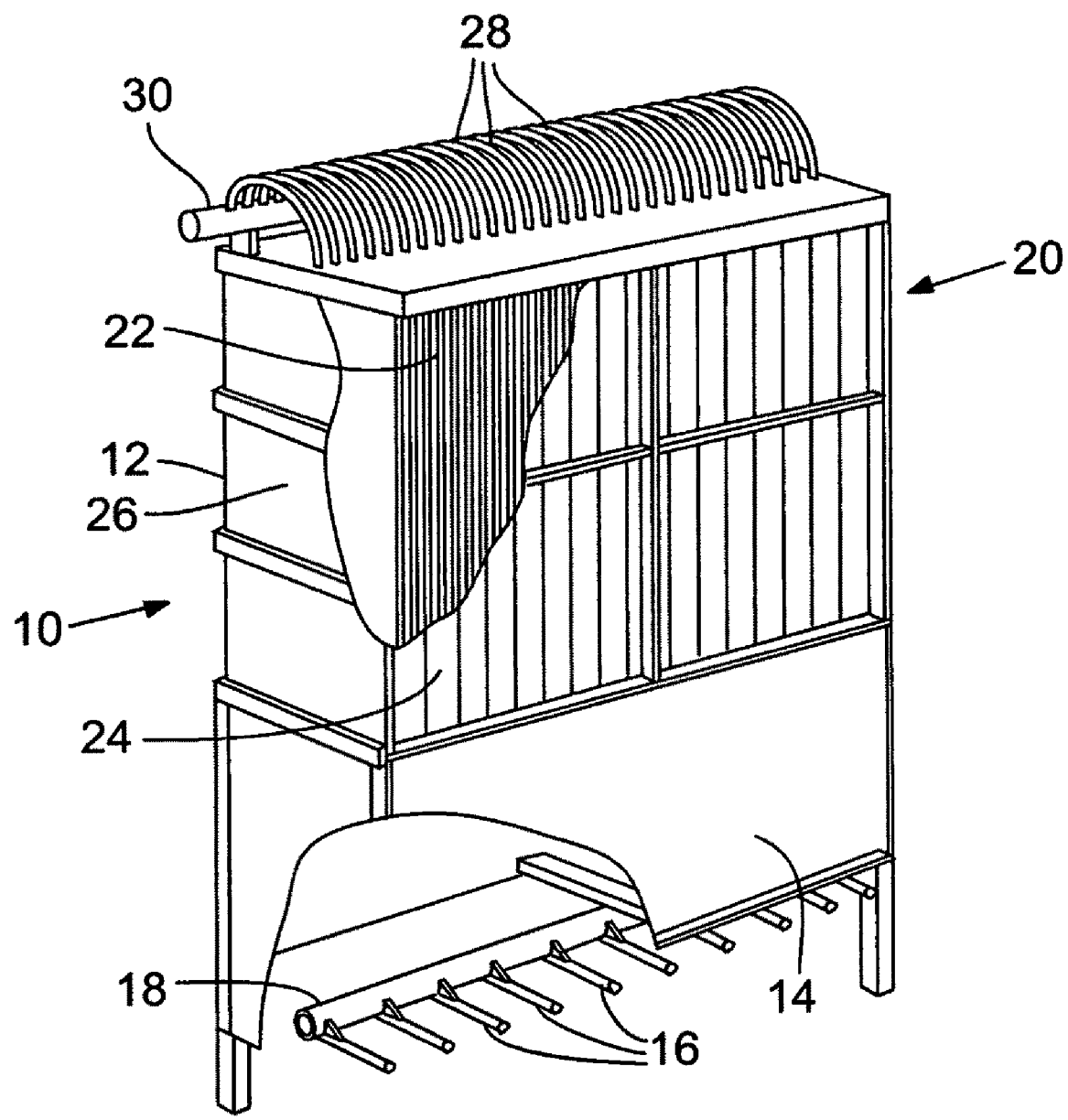
FIG. 1 is a schematic perspective view showing a membrane cassette holding a multiplicity of membrane cartridges, with portions broken away to reveal the interior.

FIG. 1 shows a typical flat-plate membrane cassette 10 as removed from a treatment system usually involving dozens of these cassettes, or even hundreds. The cassette 10 has a frame 12 that supports a diffuser case 14 within which air diffusers 16 are positioned, fed by an air line 18 as shown. As is well known, the air diffusers oxygenate the water while also providing the air scour for preventing buildup of material on the membranes. The upper portion of the cassette 10 is a membrane case 20 that holds a multiplicity of membrane cartridges 22 and side by side, but spaced apart, relationship. A typical membrane case may have 200 membrane cartridges. A portion of one side panel 24, along with a portion of one end panel 26, is shown broken away to reveal the membrane cartridges. The cartridges, each typically comprising a plastic plate with water channels or grooves, over which a filter membrane element is attached to both sides, are retained in the membrane case, at substantially regular spacings, by slots formed at the bottom of the membrane case at both sides, (not extending across the bottom where the scouring air rises). Similar slots or registry devices (also not shown) are at the top edges of the membrane case.

Shown at the top of the cassette unit 10 is a water collection tube 28 to which filtrate water is channeled up from the membrane cartridges. This filtrate is conducted from the bank of membrane cassettes to a permeate header 30 which is at negative pressure. Minimum suction pressure must be maintained at two to four inches Hg vacuum pressure to keep water retention from occurring in each cartridge and causing ballooning in the bottom of each cartridge. Ballooning will cause sludge accumulation in the bottom of the cartridge.

Manufacturers of the cartridges 22 and cassettes 10 typically recommend against removal of the side panels 24, which are on the side illustrated on the opposite side of the cassette 10. However, the panels are removable and this invention in one aspect involves removal of the panels at one or both sides. The invention also encompasses cleaning a cassette from top and bottom, without removing side panels (which sometimes are not practically removable).

Figure 2:
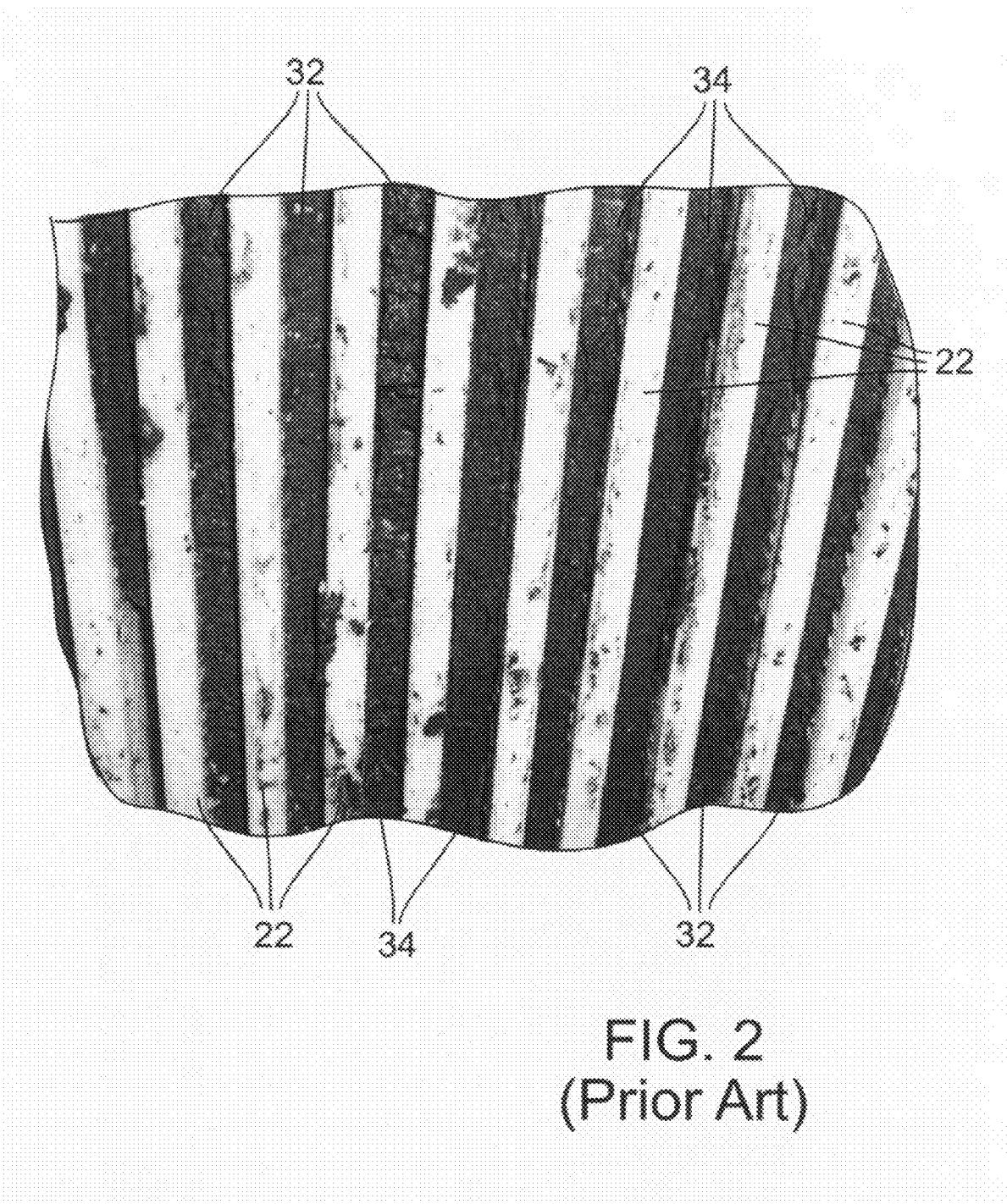
FIG. 2 is a side view of cartridges in a cassette from one side edge, showing dewatered sludge adhered to the membranes of the cassettes.

FIG. 2 shows what happens when dewatered sludge is allowed to accumulate on the membranes. In FIG. 2 the edges of the membrane cartridges 22 are revealed after removal of a side panel from a cassette such as shown in FIG. 1. Dewatered sludge, shown at 32 at many locations in the figure, forms in nearly all the spaces 34 between adjacent cartridges and can bridge across the spaces, virtually clogging the membranes and reducing membrane flux by more than half. With the invention 500 to 2000 pounds of sludge can be removed from one cassette, in about 15 to 20 minutes cleaning time (about 30 minutes total cassette in/out time).

Figure 3:
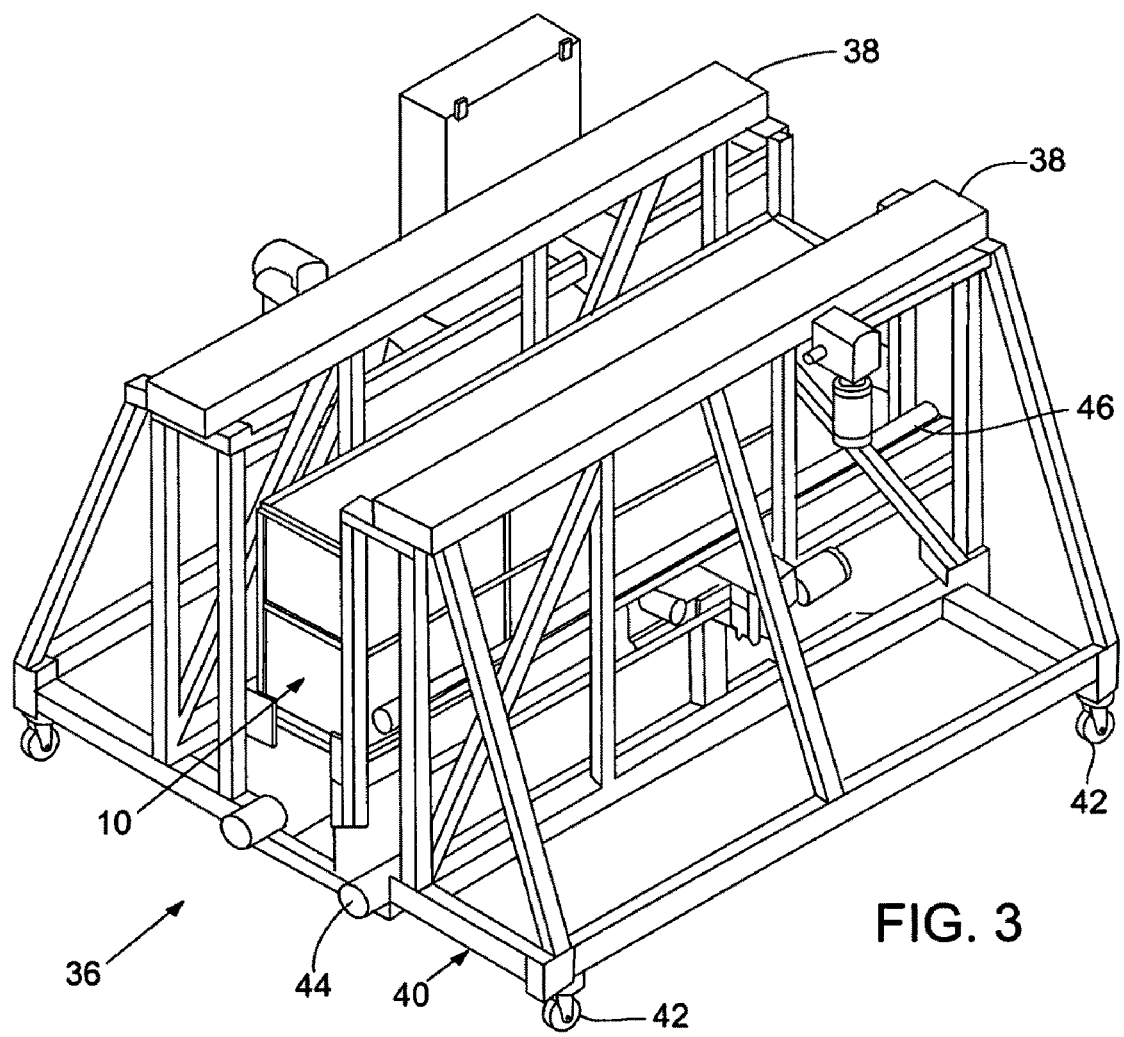
FIG. 3 is a perspective view indicating a preferred embodiment of apparatus according to the invention, for treating a membrane cassette from both sides by spraying water jets between the cartridges to remove the caked solids.

FIG. 3 shows a cleaning apparatus 36 of the invention, with a membrane cassette 10 positioned in or adjacent to the assembly. Although shown as a single apparatus 36, this can be formed as two separate sections 38, or a single section 38 which is placed only on one side of the cassette 10, or one side and then the other sequentially. The cleaning apparatus has a frame 40 (at one or both sides), and this frame, which may be mobile with wheels 42, is positioned adjacent to a membrane cassette 10 with the side panel or panels removed. This exposes the edges of the cartridges 22, shown in FIG. 2, to water spray jets from the apparatus 36. FIG. 2 shows edges of the plastic plates on which the membrane material is attached.

In a preferred embodiment the cleaning apparatus includes a movable carriage 44 which is moved up and/or down along the side of the membrane cassette to treat the inter-cartridge spaces which have become fouled with dewatered sludge. The carriage motion preferably also includes side-to-side motion, to assure complete coverage. The frame 40 can carry a motor for raising and lowering the carriage 44, or the movement of the carriage, as stated above, can be by hydraulic or pneumatic cylinders (not shown), fed by pressurized fluid either on the apparatus frame 40 or elsewhere, via a fluid line. Side-to-side motion preferably is simultaneous with up/down motion.

Pressurized water is also fed to the movable carriage 44, which carries horizontally-mounted manifolds, i.e. pipes 46 carrying water jets of specific parameters. These jets are spaced apart generally along the width spanned by the cartridges and they are positioned to throw a water spray of desired intensity, flow rate, velocity and other parameters between cartridges to clean the dewatered sludge off the faces of the membranes without damaging the cartridges. In a preferred form of the system the cutting spray nozzles are of diameter in the range of about 0.03 to about 0.06 inch, producing an impingement pressure of about 3 to 20 psi or up to 25 psi (all psi figures herein are gauge pressure) at 12 inch distance from the nozzle. Maximum impingement pressure at 6 to 12 inches is 20 to 25 psi; beyond that the jets can damage the welds attaching the membranes to the frames. One preferred range is about 10 to 15 psi impingement pressure at 12 inches. The nozzles may be about 2 to 3 inches from the edges of the cartridges. Volumetric flow rate preferably is in the range of about 0.3 to 0.7 gallons per minute for each nozzle. Pulsing of spray can be used if desired, though not preferred. Preferably an upper manifold or pipe 46 carries one set of cutting jets while one or more lower pipes or manifolds (not specifically shown in FIG. 3) carry further jets. Through a series of tests it was determined that a nozzle of about 0.047+/−0.007 inch (or about 0.040 to 0.055 inch), at about 40 to 60 psi behind the jet, provides optimum energy delivery without weld damage.

Figure 4:
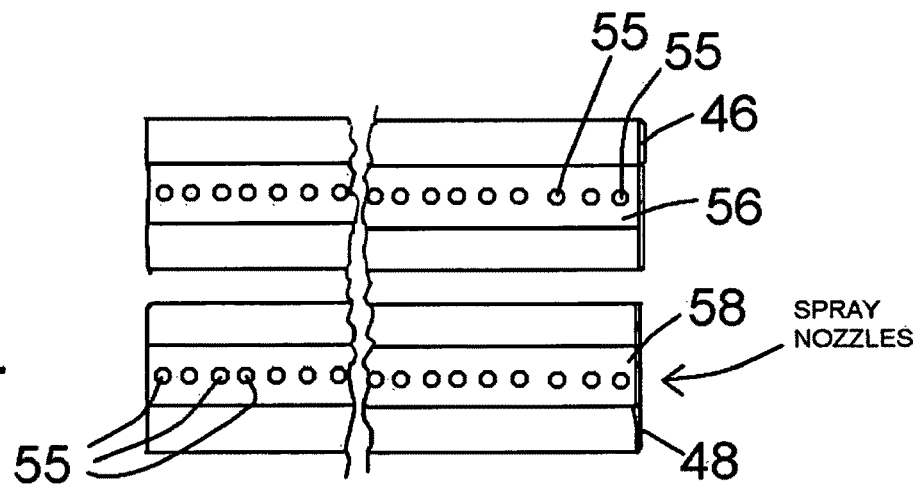
FIGS. 4 and 5 are schematic frontal elevation and side elevation or sectional views showing an arrangement of water jets.
Figure 5:
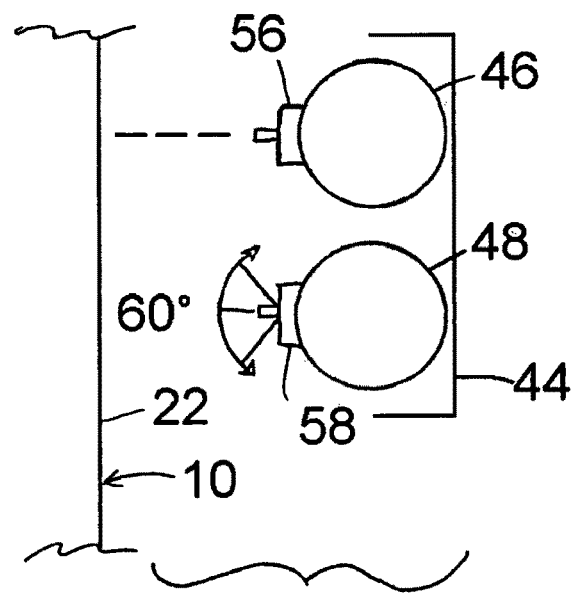

FIGS. 4 and 5 show schematically an arrangement of nozzle jets that can be used in the invention. FIG. 4 is an elevation view looking at the nozzles from the point of view of the cassette, while FIG. 5 is a side elevation view, both very schematic, and representing only one side of the machine shown in FIG. 3. In FIG. 4 the nozzles 55 are shown as mounted on upper and lower manifold bars 56, 58, each of which is welded or otherwise secured to a pipe 46, 48 carrying the pressurized water. The nozzles could be threaded directly into the pipes 46 and 48, but the hollow bar 56 on the pipes provides a flat frontal surface, better facilitating machining of the threaded nozzle holes.

FIG. 4 shows only some of the nozzles, and there may be, for example, about 120 nozzles on the upper manifold bar 56 and another 120 on the lower manifold bar 58. This is merely an example of the number of nozzles that could be used for a cassette carrying 200 cartridges. The cartridges are quite closely spaced, and although the nozzles 55 could be spaced the same as the cartridges (especially with staggering of nozzle height within a line of nozzles), it is efficient to spread the 120 or so nozzles over the entire width spanned by the 200 cartridges, which puts them at greater spacing than the cartridges, and to move the carriage with the nozzles side-to-side during treatment of the cartridges. In FIGS. 4 and 5 the carriage 44 (FIG. 3) is not shown but a portion of the carriage is represented at 44 in FIG. 5.

In the implementation illustrated in FIGS. 4 and 5, the upper and lower nozzle bars 56 and 58 are provided in order to allow for angular adjustment with one set of nozzles. This is shown in FIG. 5 with the lower pipe and nozzle bar 58. Preferably rotation of the pipe provides for, as indicated, up to about 30° above horizontal and about 30° below horizontal, a total of about 60° of swing. This allows operators to make this adjustment as needed when treating a particular membrane cassette. It should be understood, however, that all nozzles could be mounted on one pipe, with some of them angled downwardly or upwardly, or a single pipe could be angularly adjustable, possibly with one line of nozzles oriented at a different up/down angle than a second line of nozzles. When two pipes are included, both could be angularly adjustable if desired.

Figure 6A:
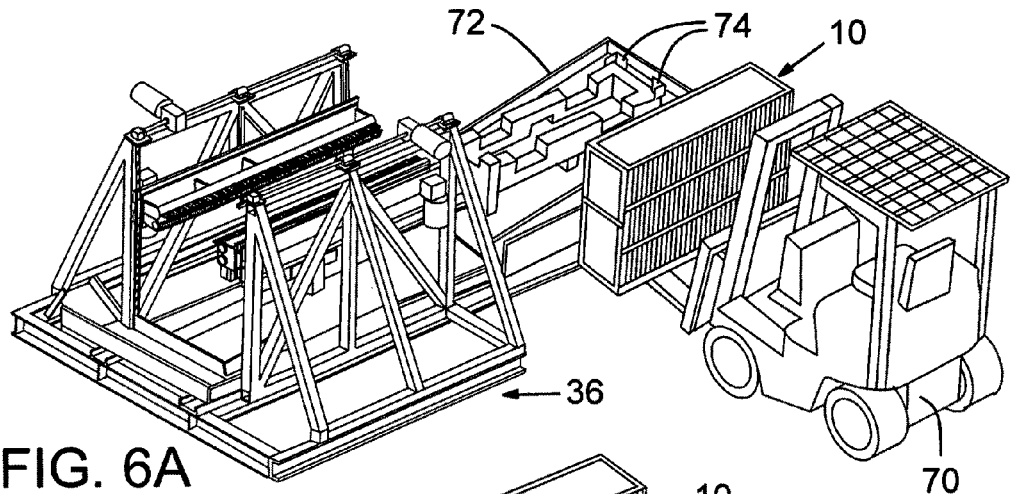
FIGS. 6A through 6D are perspective views schematically showing a procedure for loading a cassette of membrane cartridges into a cartridge cleaning apparatus of the invention.
Figure 6B:
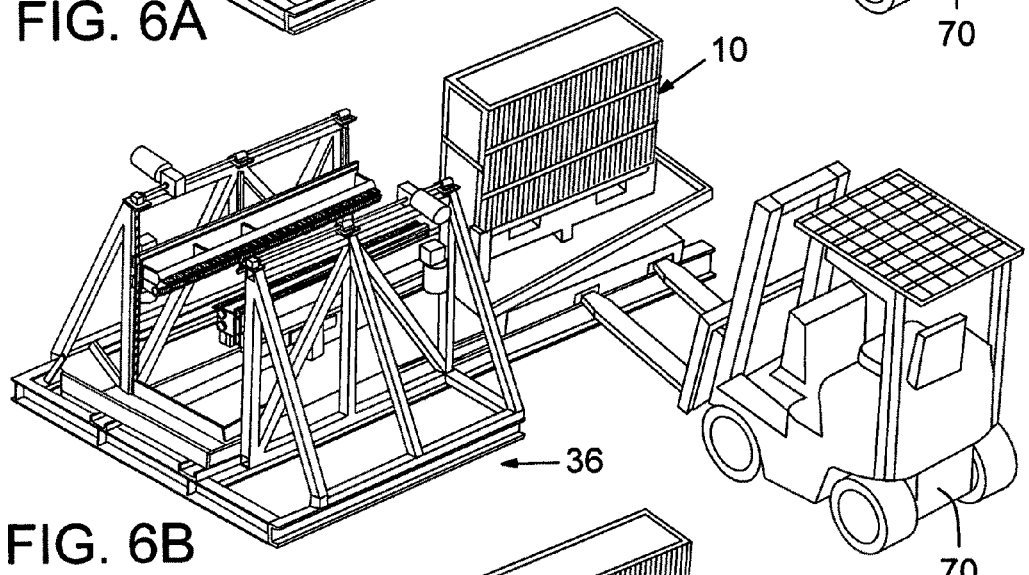
Figure 6C:
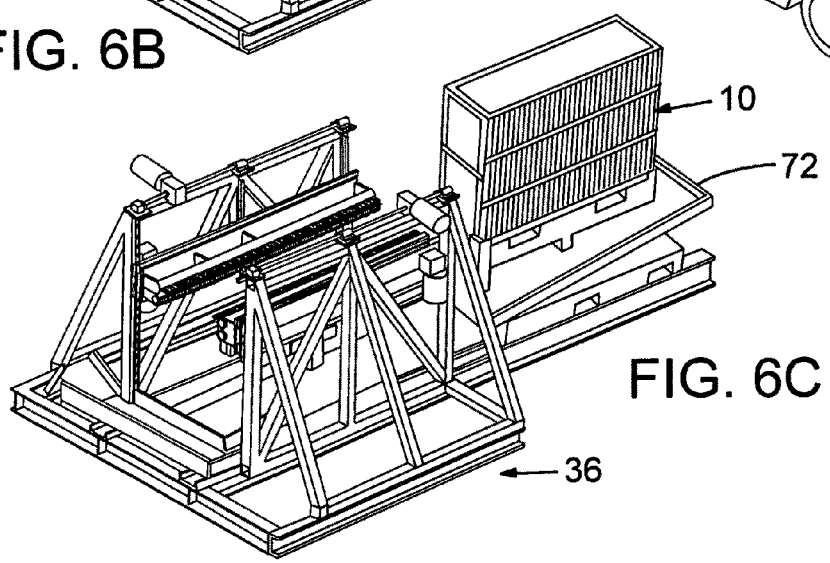

FIGS. 6A to 6D show a procedure for loading a cassette into position for cleaning. In FIG. 6A a forklift 70 carries a clogged cassette 10 which has been removed from an MBR tank. In FIG. 6B the forklift 70 has delivered the cassette 10 onto a slidable rolling platform device 72 which is preferably included with the cleaning apparatus or frame 36. FIG. 6C shows the cassette ready to be moved on the movable platform 72 into position in the frame 36 for cleaning.

Figure 6D:
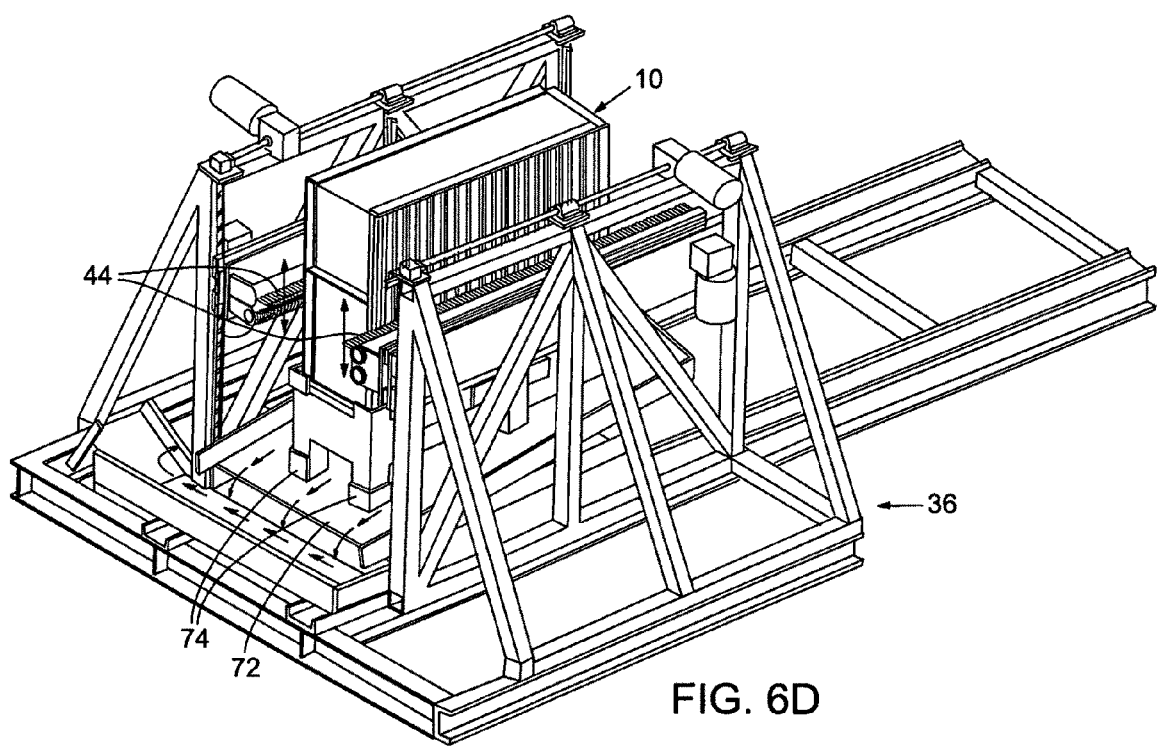
Figure 7:
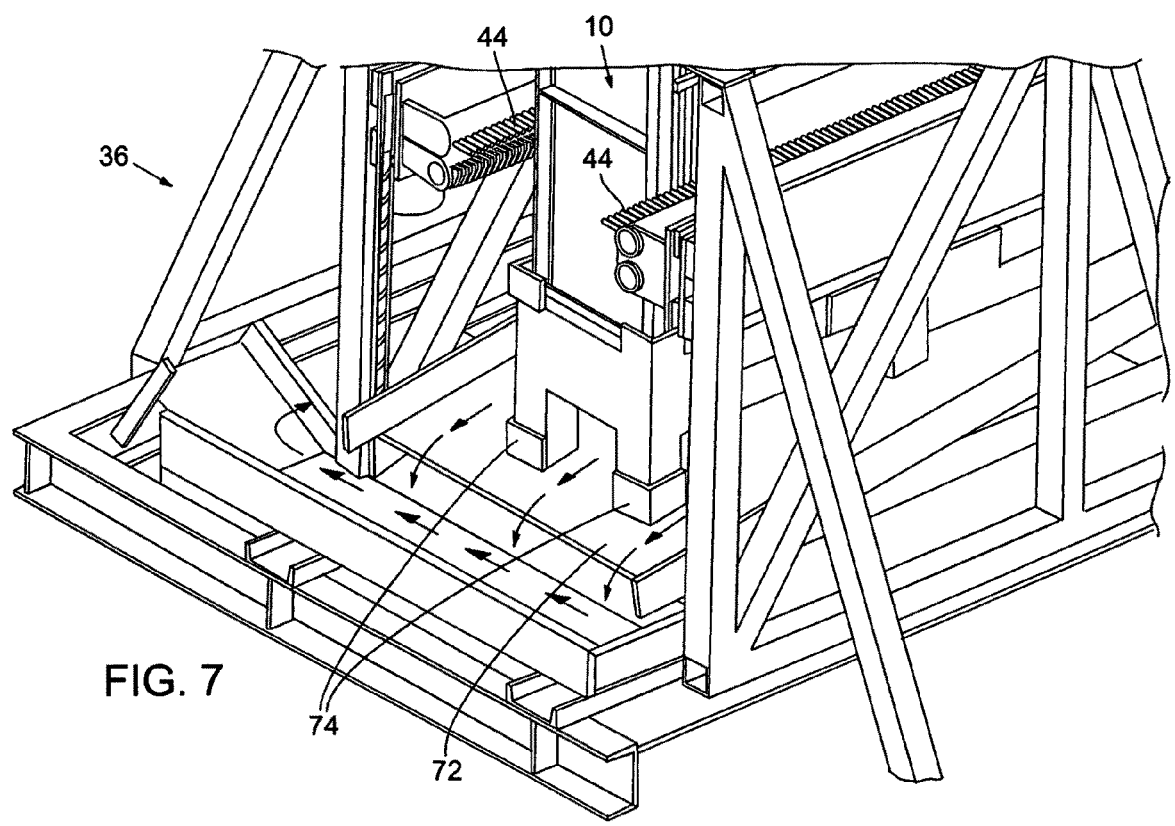
FIG. 7 is an enlarged perspective view showing drainage from the cassette.

In FIG. 6D the cassette 10 to be cleaned has been loaded into position in the frame apparatus 36. The cassette rests on the movable platform 72. Here the cassette 10 is cleaned with sprays from the nozzles on the movable spray carriages 44 on both sides of the frame, as described above. As noted above, cassettes 10 with 200 cartridges can carry over 500 pounds of dewatered sludge, sometimes up to 2000 pounds, which can be removed efficiently by the machine 36. As can be seen in FIGS. 6A through 6D, the slide platform 72 can have a sloping surface, and has a framework 74 on which the cassette 10 rests in an upright, level configuration. FIG. 7 indicates drainage from this sloping surface and shows the cassette resting on the framework 74.

Figure 8:
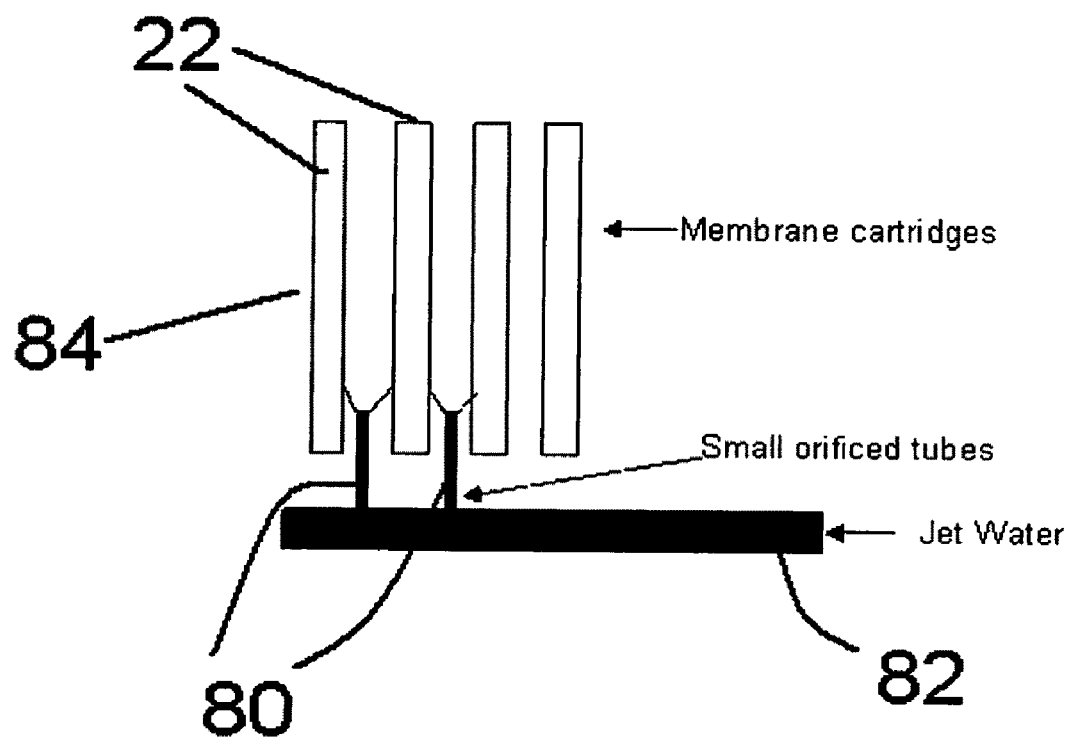
FIG. 8 is a schematic plan view indicating only a portion of the membrane cartridges in a cassette and showing an alternative arrangement for directing water jets against the dewatered sludge built up the membrane cartridges.

FIG. 8 is very schematic and indicates in a plan view a series of membrane cartridges 22 which are contained within a cassette, not shown. FIG. 8 shows a different arrangement for injecting the water sprays between cartridges. Here, rather than positioning the water jet nozzles back two or three inches from the edges of the cartridges, the nozzles are injected directly into the inter-cartridge spaces. This is done by fixing the nozzles at the ends of tubes 80 several inches in length, the tubes 80 being connected to a manifold tube or pipe 82 with high pressure water. In this case the nozzles must be spaced apart at the same spacing as the cartridges and preferably the number of nozzles should match the number of spaces. End nozzles (not shown) can be located provided at the outer ends of the series of cartridges so as to clean the outer face 84 of the two cartridges that are located at the extreme ends of the cassette, where no adjacent cartridge is positioned opposite this face 84. Thus, if there are 200 cartridges in a cassette, 201 nozzles would be needed.

Although pressures can be within the ranges stated above, an advantage of the nozzle apparatus and method shown in FIG. 8 is that much higher water pressure and impingement pressure can be used. With the nozzles just inside the inter-cartridge spaces, positioned there before they are activated, there is no risk of damage to the welds between the membrane filter sheet and the plastic plate of the cartridge. The pressure can be perhaps double the maximum described above. This can provide for greater cleaning efficiency. Disadvantages of this arrangement are the need for closer spacing of the nozzles, as well as the extending tubes that carry the nozzles, and the need for another movement in the cleaning apparatus, providing for moving the bank of tube-mounted nozzles into the inter-cartridge spacings.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A method for removing accumulated, dewatered sludge from the surfaces of a multiplicity of flat-plate membrane cartridges contained in a cassette situated in a membrane filtration tank or basin of a sewage treatment facility, without removing the cartridges from the cassette, comprising:
    removing a cassette of cartridges from the tank or basin,
    directing cutting water sprays from a plurality of nozzles through spaces between adjacent cartridges held in the cassette, in a direction essentially parallel to the flat-plate membrane cartridges, and breaking up sludge on the membrane surfaces of the adjacent cartridges,
    moving the water sprays along the spaces so as to progressively spray substantially the entire space with the cutting sprays, and
    wherein each cutting spray has a diameter in the range of about 0.03 to 0.06 inch and an impingement pressure of about 3 to 25 psi at 12 inch distance from the nozzle.

2. The method of claim 1, further including, following removing the cassette from a tank or basin, removing at least one side panel from the cassette and directing the water sprays into the spaces between adjacent cartridges from the side of the cassette with the side panel removed.

3. The method of claim 2, wherein two opposite side panels of the cassette are removed prior to directing the water sprays.

4. The method of claim 3, wherein the cutting water sprays are directed into the spaces between adjacent cartridges from both sides of the cassette.

5. The method of claim 1, wherein the nozzles are mounted on a manifold tube and moved side-to-side while being moved parallel to the spaces.

6. The method of claim 1, wherein the cutting spray has a diameter in the range of about 0.040 to 0.055 inch.

7. The method of claim 1, wherein each cutting spray has an impingement pressure of about 10 to 15 psi at 12 inch distance from the nozzle.

8. The method of claim 2, wherein the cutting water sprays are progressed both up the cartridges and down to the bottom of the cartridges.

9. The method of claim 2, including moving the water sprays in both an upward pass and a downward pass.

10. The method of claim 2, wherein the water sprays have sufficient strength to penetrate through the spaces from one side of the cassette to the other while breaking up sludge.

11. The method of claim 1, further including moving the water sprays from side-to-side in the spaces between cartridges in order to achieve full coverage of the cassette.

12. The method of claim 1, wherein the cutting water sprays are directed from a side of the cassette, and further including directing downwardly angled cutting water sprays to help remove the sludge from the membrane surfaces.

13. The method of claim 1, wherein the movement of the water sprays along the spaces is at a rate of about 30 to 120 seconds per pass along the spaces.

14. The method of claim 1, wherein the flow rate through the nozzles is in the range of about 0.3 to about 0.7 gallons per minute per nozzle.

15. The method of claim 2, wherein the nozzles are advanced automatically, mounted on a machine having a frame and a manifold carrying the plurality of nozzles, with a motor driven mechanism for advancing the manifold and the plurality of nozzles along the spaces.

16. The method of claim 15, including using a said machine with frame, manifold and motor driven mechanism on both sides of the cassette to clean cartridges from opposite sides simultaneously.

17. The method of claim 16, wherein the rows of nozzles on the two sides of the cassette are offset at different levels.

18. The method of claim 15, further including moving the nozzles side-to-side via the machine as the nozzles are moved along the spaces.

19. The method of claim 18, wherein the nozzles are arranged in a generally horizontal line at greater spacings than spacings from cartridge to cartridge, the line of nozzles spanning essentially across the cassette of cartridges, with side-to-side movement assuring coverage of all spaces.

20. The method of claim 2, further including directing downwardly angled cutting water sprays to help remove the sludge from the membrane surfaces, the angled jets being angled downwardly at an angle up to 30° from horizontal.

21. The method of claim 1, wherein the water sprays are supplied from a pump separated from the nozzles, with the pressurized water from the pump being piped to the spray nozzles.

22. The method of claim 1, wherein pressure of the water before emission from the nozzles is less than 60 psi, with the nozzles having a diameter of about 0.040 to 0.054 inch.

23. The method of claim 22, wherein the nozzle diameter is about 0.047 inch.

24. The method of claim 1, wherein the plurality of nozzles are mounted at the ends of tubes that extend from a manifold pipe, the nozzles being at space equal to the spacing between cartridges in the cassette, and including the step of moving the nozzles into the inter-cartridge spaces for directing water sprays between the cartridges.

25. A method for removing accumulated dewatered, caked sludge from the surfaces of a multiplicity of flat-plate membrane cartridges contained in a cassette situated in a membrane filtration tank or basin, without removing the cartridges from the cassette, comprising:

removing a cassette of cartridges from the tank or basin, positioning a series of nozzles just into the spaces between adjacent cartridges, such that the nozzles are directed essentially parallel to the cartridges, directing cutting water sprays from the series of nozzles through the spaces between adjacent cartridges held in the cassette, so that the water sprays are directed essentially parallel to the flat-plate membrane cartridges, and breaking up sludge on the membrane surfaces of the adjacent cartridges, and moving the water sprays along the spaces so as progressively to spray substantially the entire space with the cutting sprays to break up and remove dewatered sludge.

26. The method of claim 25, wherein each cutting water spray has a diameter in the range of about 0.03 to 0.06 inch, and wherein the cutting water sprays are directed from a side of the cassette.

27. The method of claim 25, wherein each cutting spray has an impingement pressure of about 10 to 50 psi at 12 inch distance from the nozzle.

* * * * *